US008553662B2

(12) United States Patent
Chen et al.

(10) Patent No.: US 8,553,662 B2
(45) Date of Patent: Oct. 8, 2013

(54) SYSTEM AND METHOD FOR WI-FI ROAMING

(75) Inventors: John Anthony Chen, Ashburn, VA (US); Brian Coughlin, Reston, VA (US); Geoff Filippi, Ashburn, VA (US); Dave Hawkins, Ashburn, VA (US)

(73) Assignee: Time Warner Cable Inc., New York, NY (US)

( * ) Notice: Subject to any disclaimer, the term of this patent is extended or adjusted under 35 U.S.C. 154(b) by 334 days.

(21) Appl. No.: 12/859,964

(22) Filed: Aug. 20, 2010

(65) Prior Publication Data
US 2012/0044914 A1   Feb. 23, 2012

(51) Int. Cl.
*H04W 4/00* (2009.01)
*H04W 36/00* (2009.01)

(52) U.S. Cl.
USPC ............................ 370/338; 455/439; 455/433

(58) Field of Classification Search
USPC ....................................................... 370/338
See application file for complete search history.

(56) References Cited

U.S. PATENT DOCUMENTS

| 2002/0022483 | A1* | 2/2002 | Thompson et al. ........... 455/439 |
| 2004/0008645 | A1 | 1/2004 | Janevski et al. |
| 2005/0261970 | A1* | 11/2005 | Vucina et al. ................... 705/16 |
| 2006/0018281 | A1* | 1/2006 | Sadot et al. .................... 370/331 |
| 2006/0079228 | A1 | 4/2006 | Marsico et al. |
| 2006/0140150 | A1 | 6/2006 | Olvera-Hernandez et al. |
| 2008/0165740 | A1 | 7/2008 | Bachmann et al. |
| 2009/0054037 | A1 | 2/2009 | Kaippallimalil |
| 2009/0286534 | A1 | 11/2009 | Garg et al. |
| 2010/0040016 | A1 | 2/2010 | Lor et al. |

FOREIGN PATENT DOCUMENTS

KR   10-2006-0032091 A   4/2006

OTHER PUBLICATIONS

Kadlec, Jaroslav, et al. "Precise measurement of wireless network roaming functionality and network component parameters applied for automation systems"; Third International Conference on Systems (icons 2008); Apr. 13-18, 2008.
International Search Report and Written Opinion issued in PCT Application PCT/US2011/047714, mailed on Jan. 18, 2012.
International Search Report and Written Opinion issued in PCT Application PCT/US2011/047721, mailed on Apr. 9, 2012.

* cited by examiner

*Primary Examiner* — Noel Beharry
(74) *Attorney, Agent, or Firm* — The Marbury Law Group, PLLC

(57) ABSTRACT

Systems and methods for Wi-Fi roaming. A gateway supports both a local access point (AP) and a virtual AP. The local AP is accessible only to an "owner" of the gateway. The virtual AP (VAP) is accessible to devices associated with the owner of the gateway and to roaming Wi-Fi devices. A datastore conveys information about the roaming Wi-Fi devices to the VAP to permit them to access the VAP without the need for manual configuration of the VAP. A roaming Wi-Fi device may communicate with a gateway via a tunnel to maintain session connectivity during roaming. A session may be initiated on one network, such as a Wi-Fi network or a cellular network, handed off to another network, such as a cellular network or a Wi-Fi network, and then returned to network on which the session was initiated.

19 Claims, 9 Drawing Sheets

SYSTEM AND METHOD FOR WI-FI ROAMING

BACKGROUND

High speed data (HSD) service providers typically offer subscribers a gateway device that provides wired connectivity to a fiber, coax or hybrid medium and a Wi-Fi access point (AP) for connectivity within the home or business. The subscriber typically configures the AP with an SSID and a password and may also select an encryption key for encrypting data. In neighborhoods where a single HSD service provider has a significant subscriber base, many Wi-Fi APs are operational but are accessible only to a single SSID. Wi-Fi devices may be configured to access an open Wi-Fi network. If the Wi-Fi AP is configured with filters and/or encryption, then only those Wi-Fi devices configured to meet the filtering parameters and/or with the encryption key may use those AP.

Thus, access to either an open network or a secured network requires a Wi-Fi device to be configured specifically for the network to be accessed. When the Wi-Fi device moves out of range of one AP and into range of another AP, the Wi-Fi device must be reconfigured. Again, if the AP is configured to provide a secured network, the Wi-Fi device must have access to the security parameters of the secured network.

Public Wi-Fi APs, also known as "hot spots," also require users to register and set up their wireless device using parameters that differ from the subscriber's home settings. Typically, these parameters include security settings that may include a hotspot SSID and a 12-40 character password or pass phrase. Additionally, a user of a public Wi-Fi AP may be required to sign up/register using a web browser on their wireless device in order to gain access. These extra steps may deter users of Wi-Fi devices from connecting to hot spots. In addition, advanced users may prefer their own SSID and securities and are less likely to trust wireless hot spots. Due to these issues, many network service subscribers that have Wi-Fi enabled mobile devices only enable them at their home, making their mobile devices less useful.

One alternative to Wi-Fi is a mobile device that bridges cellular service to Wi-Fi devices that do not have a cellular radio. A mobile bridging device thus acts as a Wi-Fi AP and uses the cellular service as the connection to the Internet. Mobile bridging devices require that at least one user have an account with a cellular provider. Additionally, mobile bridging devices have limited battery life. A user of a mobile bridging AP faces the same issues previously described.

Some terrestrial network service providers have placed secured Wi-Fi access points in businesses. Patrons may access the Internet for the duration of their stays. However, when a patron leaves the establishment, the Wi-Fi signal degrades and the connection to the Internet is quickly lost.

Under these circumstances, a significant number of Wi-Fi enabled devices are underutilized and a significant amount of Wi-Fi bandwidth that could be used for roaming by other subscribers of HSD service providers is going unused.

SUMMARY

Embodiments herein are directed to enabling Wi-Fi roaming.

In an embodiment, a gateway supports both a local access point (AP) and a virtual AP. The local AP is accessible only to an "owner" of the gateway. The virtual AP (VAP) is accessible to devices associated with the owner of the gateway and to roaming Wi-Fi devices. A datastore conveys information about the roaming Wi-Fi devices to the VAP to permit them to access the VAP without the need for manual configuration of the VAP.

In another embodiment, a roaming Wi-Fi device may communicate with a gateway via a tunnel to maintain session connectivity during roaming.

In still another embodiment, a session may be initiated on one network, such as a Wi-Fi network or a cellular network, handed off to another network, such as a cellular network or a Wi-Fi network, and then returned to the network on which the session was initiated.

DETAILED DESCRIPTION

Figure 1:
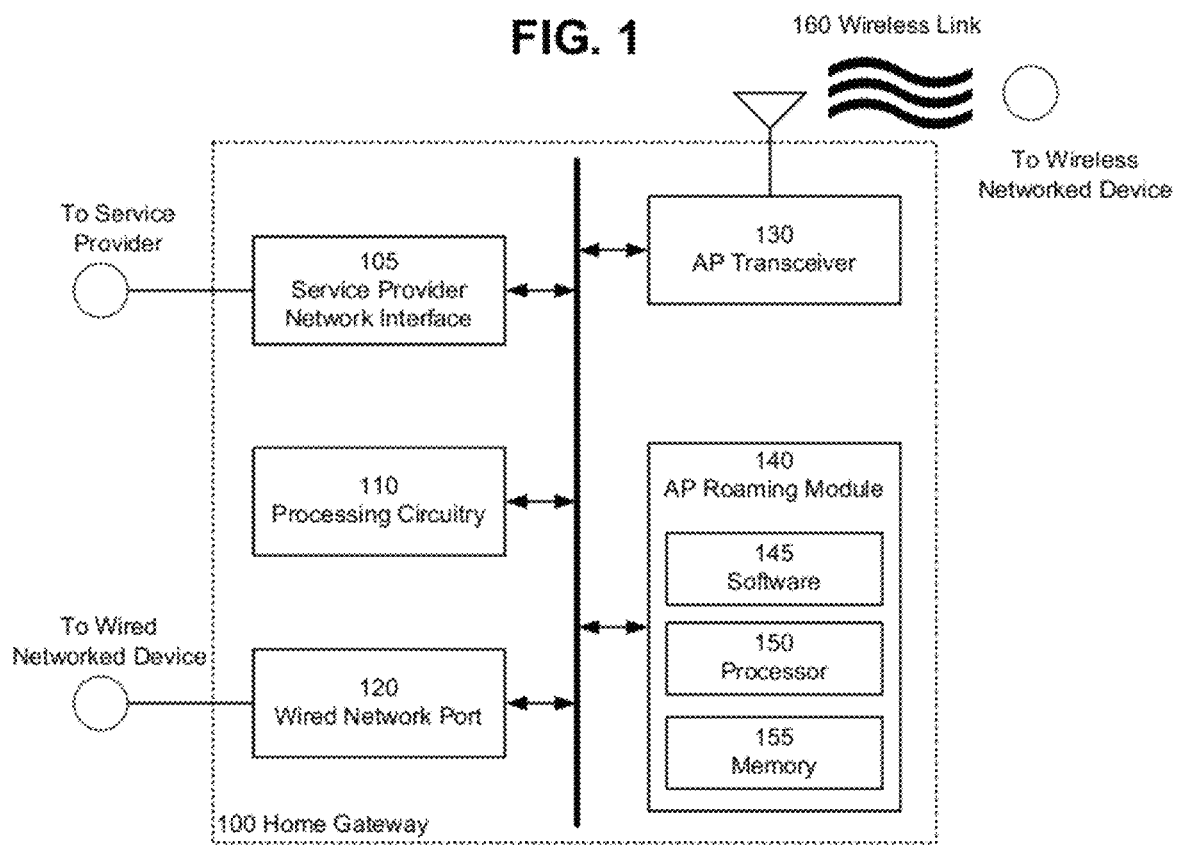
FIG. 1 is a block diagram illustrating a home gateway according to an embodiment.

As used herein, the term "access point" or "AP" encompasses a device that serves as a point of logical connection for Wi-Fi devices such as laptop computers, notebook computers, PDAs, VoIP phones and dual network (cellular plus Wi-Fi) phones. A typical AP may be configured to confirm that a particular wireless user is authorized to connect to the network (authentication), manage the encryption and decryption of data packets, and, when configured as router, forwards IP packets from one IP host to another over an arbitrary link. An AP may also be configured as a bridge that converts packets from a wired Ethernet frame format into an 802.11 Wi-Fi frame format.

As used herein, the term "HSD service provider" encompasses HSD service providers that provide HSD services over fiber, fiber-hybrid-coax, twisted pair, and coax, and wireless networks and HSD over combinations of those media.

As used herein, the term "home gateway" encompasses a wireless network and/or terrestrial network connected devices with one or more physical Wi-Fi (IEEE 802.11a/b/g/n) APs. While it is anticipated that a home gateway may be located in the residence of a subscriber of an HSD service provider, other embodiments are possible. By way of illustration and not by way of limitation, a device performing some or all of the functions of a "home gateway" as described herein may be located outside of a residence and may be part of the HSD service provider's plant.

As used herein, the term "authentication" encompasses passing authentication credentials to a Wi-Fi access point that identify a user of a Wi-Fi device as authorized to access the Wi-Fi access point. For example, the authentication credentials may include the MAC address of the Wi-Fi device and the SSID of the subscriber's network. An AP and a Wi-Fi device authenticate via authentication request frames sent by the Wi-Fi device and authentication response frames sent by the AP in response to the request. If a Wi-Fi device and an AP are configured to use a shared key, the exchange of authorization frames will include the Wi-Fi device using the shared key to encrypt challenge text. The AP will use the same key to decrypt the challenge text to verify that the Wi-Fi device has possession of the correct key.

As used herein, the term "association" encompasses a process by which an AP and a Wi-Fi device establish a link for sending and receiving data. The term "reassociation" encompasses a process by which a Wi-Fi device that is associated with an AP seeks to associate with a different AP. The "association" (or reassociation) of a Wi-Fi device and an AP may be initiated by a Wi-Fi device sending an association request frame (or, if appropriate, a reassociation request frame) that may include the Wi-Fi device's SSID and supported data rates. The access point may respond by sending a response frame containing an association ID along with other information regarding the access point.

As used herein, the term "security credentials" encompasses a subscriber's security protocol (for example, Wired Equivalent Privacy or WEP, and Wi-Fi Protected Access or WPA) and a security key consistent with the protocol used.

FIG. 1 is a block diagram illustrating a home gateway according to an embodiment.

A home gateway 100 comprises a service provider network interface 105 that connects an HSD service provider network to wired networked devices through one or more wired network ports 120 and to wireless devices through one or more AP transceivers 130. The AP transceivers transmit and receive data over a wireless link 160 to and from wireless devices. In an embodiment, the wireless link may be an 802.11x compliant link (sometimes referred to herein as a "Wi-Fi" link).

The home gateway 100 may also include processing circuitry 110 that implements software instructions to manage the general operation of the home gateway 100, including by way of example the receiving, transmission and routing of data, housekeeping functions, quality of service functions, and signal power management among others. The processing circuitry 110 may be a single processing device or a plurality of processing devices. Such a processing device may be, for example, any one or more of a microprocessor, microcontroller, digital signal processor, field programmable gate array, programmable logic device, logic circuitry, state machine, analog circuitry, digital circuitry, and/or any device that manipulates signals (analog and/or digital) based on operational instructions. The processing circuitry 110 may comprise a memory (not illustrated), read-only memory, random access memory, volatile memory, non-volatile memory, flash memory, static memory, dynamic memory, optical or magnetic storage, and/or any device that stores digital information.

In an embodiment, the wireless link 160 is a wireless link of a wireless network conforming to a communication protocol such as 802.11(a, b, g, or n).

The interface 105, the network ports 120 and selected functions of AP transceiver 130 may be implemented in hardware, firmware or software. Other functions of transceiver 130 may be implemented in analog RF (Radio Frequency) circuitry as will be understood by one skilled in the art. When implemented in software, the operational instructions used to implement the functions and features of these devices can also be implemented on processing circuitry 110.

In an embodiment, the AP transceiver 130 modulates the data to produce an RF signal of the wireless link 160. In an embodiment of the present invention, the AP transceiver 130 transmits at one of a plurality of power levels, as determined by a power management application implemented by the software 145. By way of illustration and not by way of limitation, the transmit power of the AP transceiver 130 may be increased when the home gateway 100 is providing services to roaming Wi-Fi devices as further described below. In another embodiment, the transmit power is limited according to applicable laws of the jurisdiction in which the home gateway 100 is operated.

AP transceiver 130 is further operable to receive signals from a Wi-Fi device over wireless link 160. In this instance, the transceiver 130 receives an RF signal and demodulates the RF signal to obtain a base-band signal to recapture a packet of data.

The interfaces 105, the network ports 120 and the transceiver 130 may be assigned separate unique MAC addresses to permit the operations of these components to be monitored by external devices and to provide external management of these components.

The AP roaming module 140 is configured to interface with the AP transceiver 130 and to create and manage one or more access points that are logically separate from a home AP (the logical AP sometimes referred to herein as a "virtual access point" or "VAP"). In an embodiment, a processor 150 of the AP roaming module 140 operates software 145 to create and manage the VAP and to allow the VAP to emulate the operation of a physical AP at the MAC layer while operating with distinct SSID and key sets. The SSID and key sets may be stored in a memory 155. In another embodiment, the processor 150 of the AP roaming module 140 may operate software 145 to provide partial emulation of the IP and Application Layer behavior of physical AP to provide authentication, accounting and diagnostic functions that are independent of the physical AP. At the IP layer, the VAP may be provided a distinct IP address and a fully qualified domain name (FQDN). At the Application Layer, the behavior of distinct physical APs may be emulated by providing each VAP with its own set of SNMPv3 secrets and SNMPv2 communities, RADIUS shared secrets, and Web and telnet login identities. These emulations provide the service provider or other manager of the Wi-Fi roaming network access to the configuration settings of the one or more VAPs through either automated or manual means.

The software 145 also permits a subscriber to register designated SSID and security credentials in association with a Wi-Fi device's unique MAC address.

In an embodiment, when a subscriber establishes an SSID and security credentials at the home gateway 100, the subscriber may be offered an option to subscribe to a Wi-Fi roaming service. In another embodiment, the offer to subscribe to a roaming service may be dependent on the number of installed gateways of the service provider in proximity to home gateway 100. In this embodiment, the roaming module is configured by the service provider to offer the roaming service when the dependency is met.

Figure 2:
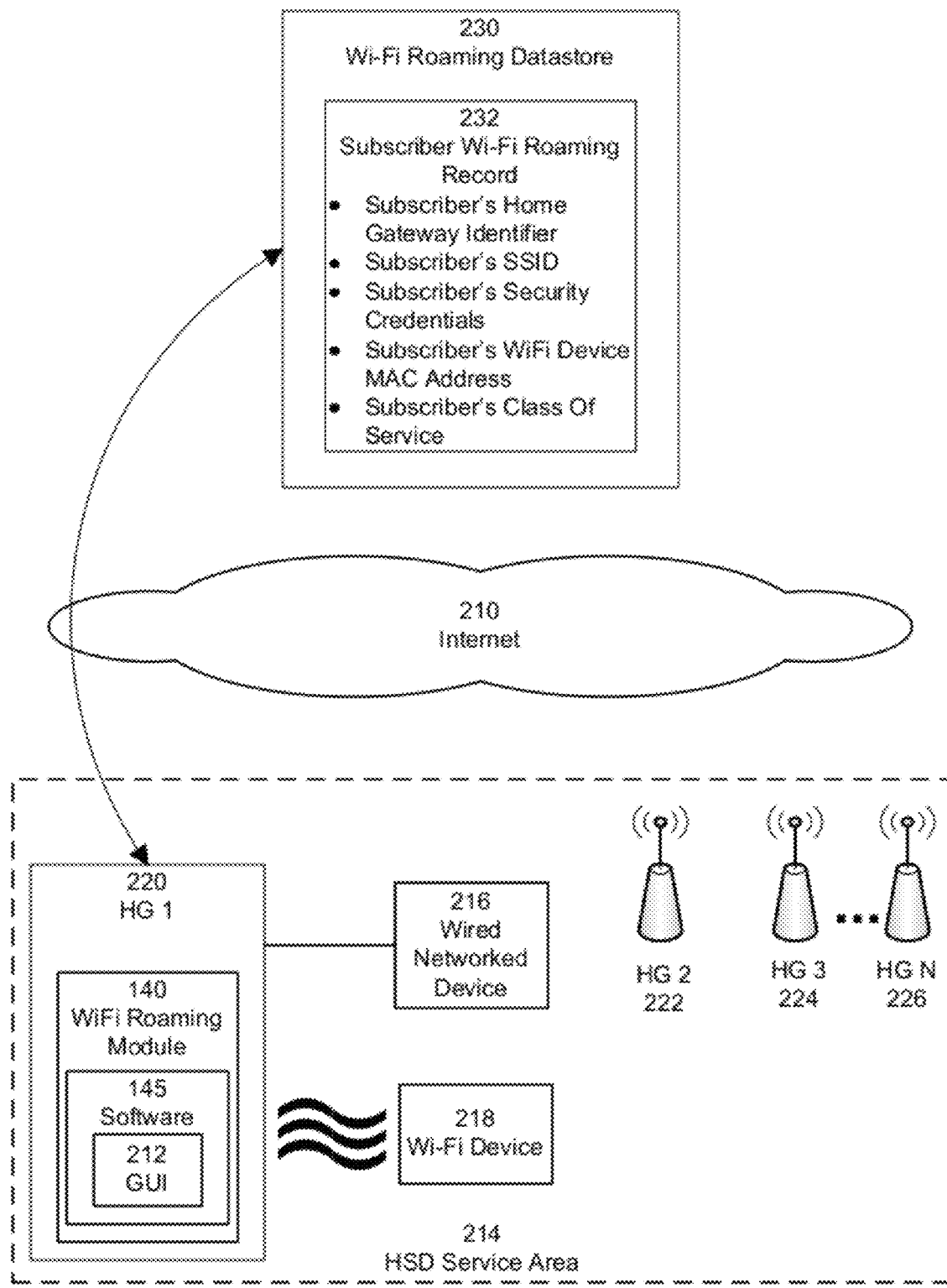
FIG. 2 is a block diagram illustrating a network of home gateways operating in conjunction with a central datastore according to an embodiment.

FIG. 2 is a block diagram illustrating a network of home gateways operating in conjunction with a central datastore according to an embodiment.

As illustrated in FIG. 2, an HSD service provider has installed a plurality of home gateways in an HSD service area 214, including HG 1, HG 2, HG 3 and HG N (220, 222, 224, and 226). HG 1-HG N each comprises a Wi-Fi roaming module 140 that comprises software 145. The software 145 further comprises a graphical user interface (GUI) 212. (These elements are only illustrated for HG 1 220 for clarity.)

In an embodiment, an HG 1 220 communicates with a wired networked device 216 and a Wi-Fi device 218 over a wireless link. By way of illustration and not by way of limitation, Wi-Fi device 218 complies with the 802.11a/b/g/n standard. The Wi-Fi device 218 may be configured with a home SSID and with security credentials that permit it to access HG 1 220 to send and receive data. While only one Wi-Fi device 218 and one wired networked device 216 are illustrated, this is not meant as a limitation. Additional Wi-Fi devices 218 and wired networked devices 216 may be configured to communicate with HG 1 220.

Figure 8:
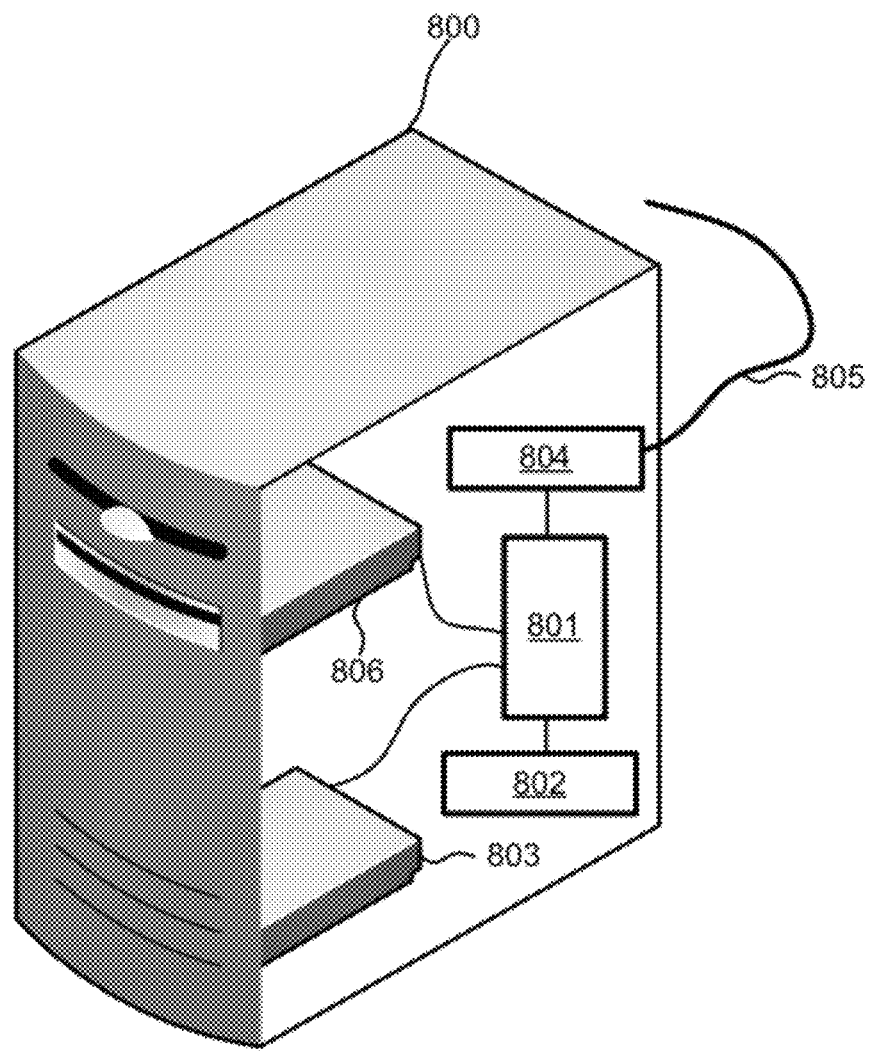
FIG. 8 is a block diagram illustrating functional components of a server.

In this embodiment, the service provider has installed HG 2 through HG N in HSD service area 214 and has elected to offer roaming Wi-Fi services to its subscribers in the HSD service area 214. The Wi-Fi roaming module 140 uses software 145 to present an offer for Wi-Fi roaming services to the subscriber associated with HG 1 220. The offer may be presented on Wi-Fi device 218 or wired networked devices 216 using GUI 212. When the subscriber associated with HG 1 220 accepts the offer for Wi-Fi roaming services, the GUI 212 presents the subscriber with a request for information. In an embodiment, the request may be pre-populated with the home SSID of HG 1 220, the subscriber's name, and the MAC address of the Wi-Fi device 218. The subscriber may be invited to add the MAC addresses of additional Wi-Fi devices 218 associated with the subscriber. The requested information is sent to a Wi-Fi roaming datastore 230 and stored in a Wi-Fi roaming record 232 associated with the subscriber. In an embodiment, the Wi-Fi roaming datastore 230 may be implemented on a server device as illustrated in FIG. 8.

In an embodiment, a subscriber who subscribes to the Wi-Fi roaming service may also subscribe to a network provided class of service (CoS). A CoS may define a roaming coverage, such as local coverage versus national coverage. A CoS may establish a priority, such as standard versus premium, which determines the priority of a Wi-Fi device under conditions of network congestion. A CoS may also establish a service measure, such as a bandwidth limit (Mb/s) or a data quota over time (2 GB/month).

Note that the CoS of the roaming subscriber does not directly affect the CoS of the owner of the home gateway providing access to a roaming Wi-Fi device. However, in order to prevent any degradation of service quality to the owner of the home gateway, additional resources may be allocated to the home gateway owner's network to account for the bandwidth consumed by the roaming subscriber.

In an embodiment, the Wi-Fi roaming datastore 230 may associate the MAC address of HG 1 220 and the subscriber's SSID, security credentials, Wi-Fi device MAC address(es) and CoS with an already pre-provisioned subscriber account which includes billing and network usage information.

In an embodiment, the MAC address of the HG 1 220 allows the network provider to find HG 1 220 on the network to allow the operations of HG 1 220 to be monitored, to permit maintenance of HG 1 220 and, when necessary, to assist the subscriber associated with HG 1 220 to configure the device.

Figure 3:
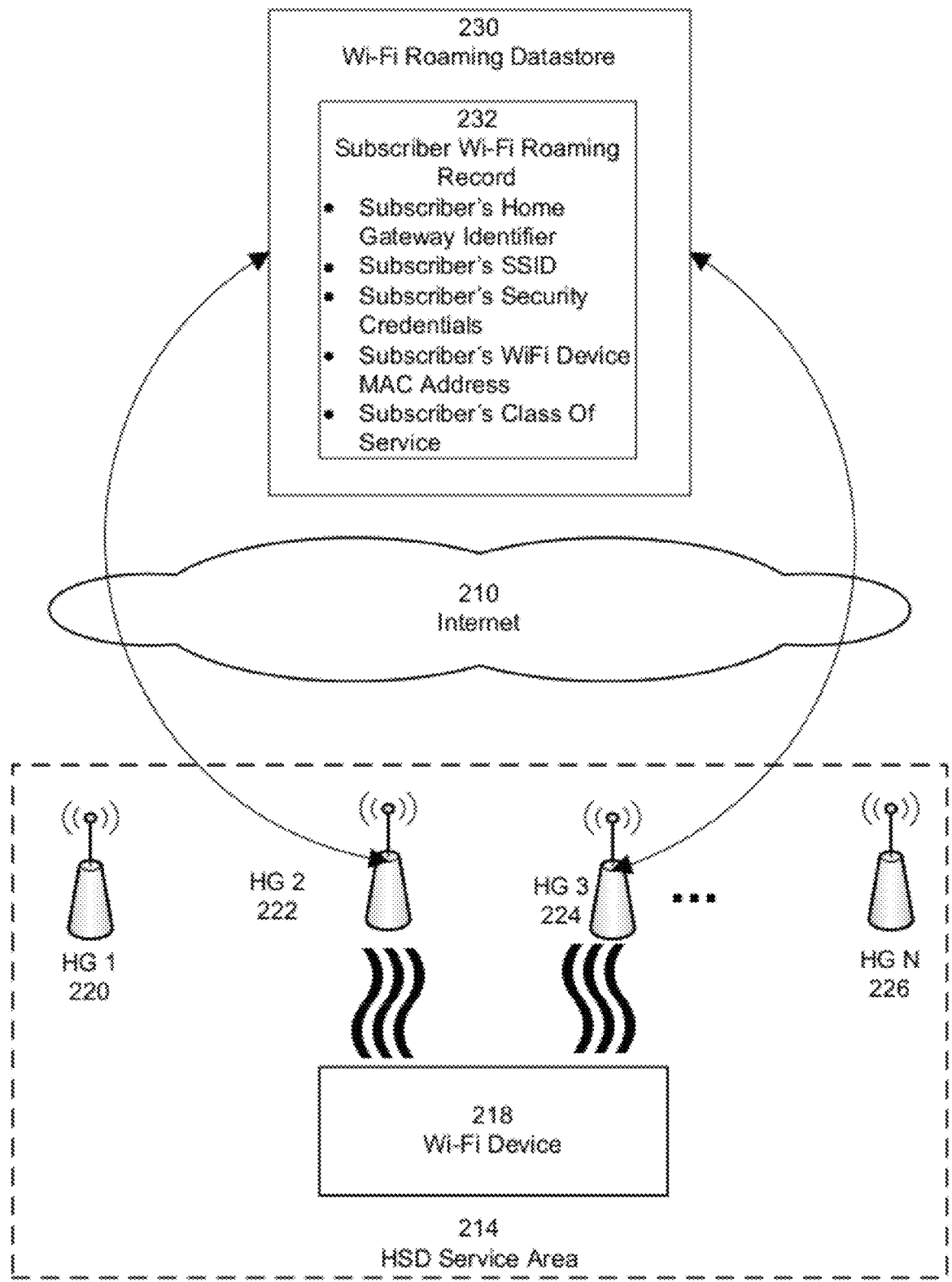
FIG. 3 is a block diagram illustrating a roaming Wi-Fi device according to an embodiment.

FIG. 3 is block diagram illustrating a roaming Wi-Fi device according to an embodiment.

When the Wi-Fi device 218 is configured to use the local SSID and security credentials of HG 1 220 (sometimes also referred to herein as the "home gateway"), the Wi-Fi device 218 may scan for a non-local Wi-Fi VAP (sometimes also referred to as a "foreign gateway").

In an embodiment, the Wi-Fi device 218 actively seeks VAPs by sending probe request frames, as for example, to the Wi-Fi VAP in HG 2 222 and to the Wi-Fi VAP in HG 3 224. The probe request frame may include the SSID of the home gateway associated with Wi-Fi device 218. In an alternate embodiment, the Wi-Fi device 218 first listens for AP-transmitted beacon signals and takes note of the corresponding signal strengths. The beacons contain information about the access point, supported data rates, etc. Wi-Fi device 218 may use this information along with the signal strength to determine that it is appropriate to send a probe request frame.

When a Wi-Fi VAP belonging to the network service provider such as Wi-Fi VAP in HG 2 222 or Wi-Fi VAP in HG 3 224 detects a probe request frame, it determines whether the SSID and the Wi-Fi device MAC data associated with Wi-Fi AP in HG 1 220 are found in a local memory to which the receiving Wi-Fi VAP has access. Alternatively, the receiving Wi-Fi VAP may check the Wi-Fi roaming datastore 230 to determine whether values matching those sent in the probe request are stored there. If the values are found in either the memory or the datastore, a probe response frame is sent from the acknowledging VAP to the Wi-Fi device 218. The Wi-Fi device 218 then authenticates and associates (or reassociates) with the responding VAP as per the normal IEEE 802.11 (Wi-Fi) standard. The SSID/Wi-Fi device MAC data may be stored in the memory 155 (see FIG. 1) of a Wi-Fi VAP as a result of a previous association with that Wi-Fi VAP.

The Wi-Fi device 218 may pre-authenticate with a Wi-Fi VAP such as the Wi-Fi VAP in HG 2 222 or the Wi-Fi VAP in HG 3 224 before reassociating with that VAP. For example, when the Wi-Fi device 218 is associated with the Wi-Fi AP in HG 1 220, the Wi-Fi device 218 may transmit a probe request including the SSID/Wi-Fi device MAC data. A Wi-Fi VAP, such as the Wi-Fi VAP in HG 2 222, may then determine whether Wi-Fi device 218 is authorized to associate with it by contacting the Wi-Fi roaming datatore 230 to locate the SSID/Wi-Fi device MAC data. During the process, Wi-Fi device 218 remains associated with the Wi-Fi AP in HG 1 220. If the SSID/Wi-Fi device MAC data are located in the Wi-Fi roaming datastore 230, the Wi-Fi device 218 is authorized. The receiving Wi-Fi VAP in HG 2 222 may retrieve the security credentials of the Wi-Fi device, including key information, from the Wi-Fi roaming datatore 230 and store them in its memory 155 (see FIG. 1). In this way, the Wi-Fi device 218 is known to the Wi-Fi VAP in HG 2 222 before the Wi-Fi device 218 disassociates with the Wi-Fi AP in HG 1 220.

In an embodiment, after the pre-authentication of the Wi-Fi device 218 with the Wi-Fi VAP in HG 2 222, a tunnel (not illustrated) between HG 2 222 and HG 1 220 is established. The tunnel does not carry traffic unless and until the Wi-Fi device 218 reassociates with the Wi-Fi VAP in HG 2 222. During the reassociation process, the IP address of Wi-Fi device 218 assigned by the HG 1 220 remains the same. In this way, the connection to HG 1 220 is maintained and the transition from the AP in HG 1 220 to the VAP in HG 2 222 is nearly seamless. When the Wi-Fi device 218 acts to disassociate from the Wi-Fi AP in HG 1 220 and reassociate with the Wi-Fi AP in HG 2 222, the time required to complete the transfer from one AP to another is significantly reduced.

In another embodiment, the SSID/Wi-Fi device MAC data of the Wi-Fi device 218 may be found in the memory 155 (see FIG. 1) of the Wi-Fi VAP in HG 2 222. In this embodiment, the security information of the Wi-Fi device 218 is acquired from the Wi-Fi roaming datastore 230.

In another embodiment, the Wi-Fi VAPs may delete the SSID/security credential/Wi-Fi device MAC data from its memory 155 (see FIG. 1), and the Wi-Fi VAP in HG 2 222 of a subscriber who has not actively associated with that Wi-Fi VAP for a period of time.

In an embodiment, when the roaming subscriber associates with a foreign Wi-Fi VAP, the roaming subscriber accesses the network provider's network via the foreign Wi-Fi VAP. In this embodiment, the roaming subscriber may access the Internet directly via the home gateway in which the foreign Wi-Fi VAP resides. In this embodiment, the Wi-Fi device will need to obtain a new IP address and/or network address translation (NAT) as it moves from one HG/VAP to another. An established session using a session based protocol, such as TCP/IP, VoIP, IPTV, etc., will be interrupted during this process.

In an alternate embodiment, the roaming subscriber may communicate with his or her home gateway via a virtual private network (VPN), Layer 2 Transport Protocol (L2TP), or any other network encapsulation protocol.

Figure 4A:
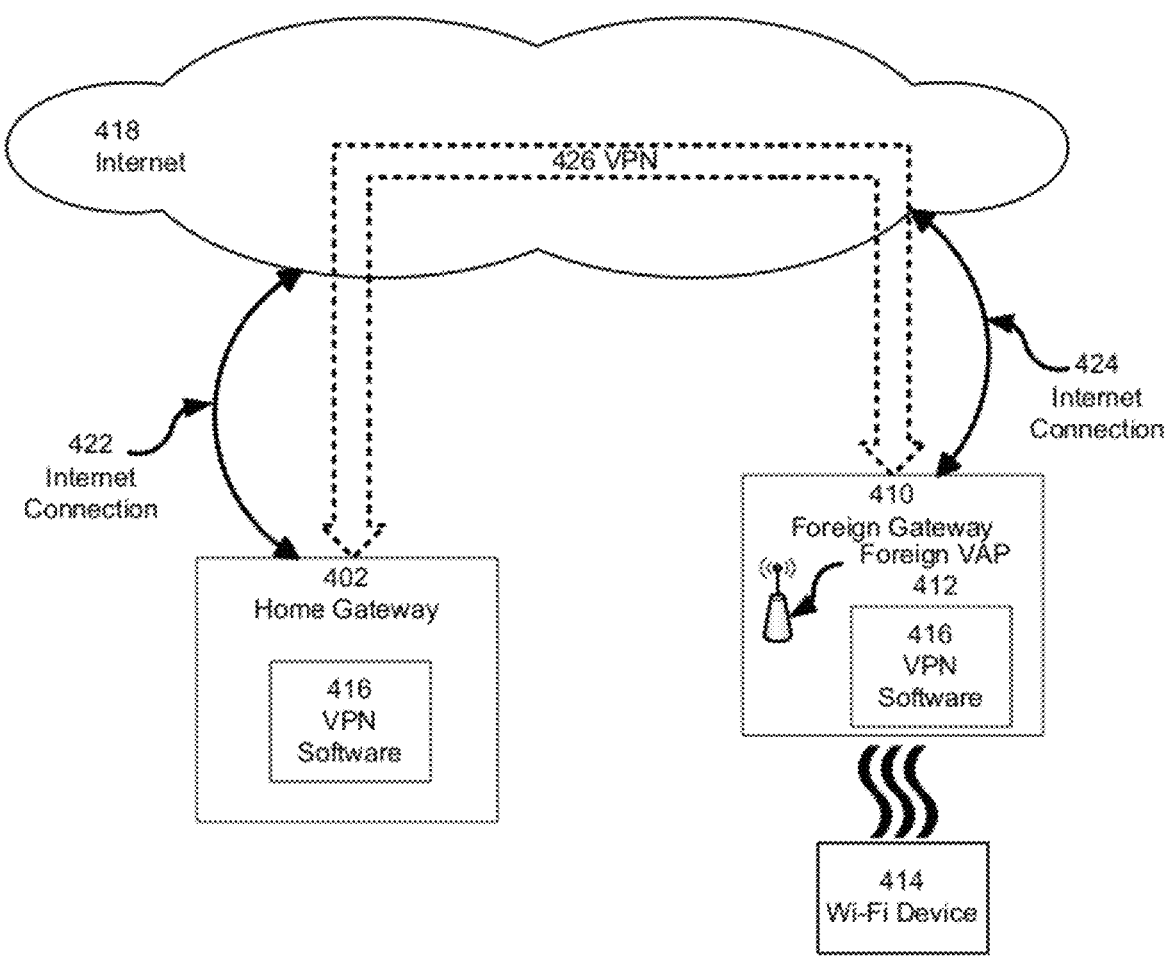
FIG. 4 is a block diagram illustrating a virtual private network connection between a home gateway and a roaming Wi-Fi device according to an embodiment.

FIG. 4A is a block diagram illustrating a virtual private network connection between a home gateway and a roaming Wi-Fi device according to an embodiment.

In this embodiment, a roaming Wi-Fi device 414 is associated with (connected to) a foreign VAP 412 in a foreign gateway 410. The foreign gateway 410 connects to the Internet 418 via an Internet connection 424. A home gateway 402 is associated with a subscriber who is also associated with the roaming Wi-Fi device 414. The home gateway 402 connects to the Internet via an Internet connection 422. In an embodiment, the Internet connections 422 and 424 may be established over a wired or wireless network. By way of illustration and not by way of limitation, the Internet connections 422 and 424 may be established over a cable network, a fiber network, a DSL connection, a satellite network, and a cellular network.

The home gateway 402 and the foreign gateway 410 comprise VPN software 416. The VPN software comprises both a VPN server and a VPN client. The home gateway 402 uses the VPN software to instantiate a VPN server on home gateway 402. The association of the roaming Wi-Fi device 414 to the foreign VAP 412 causes the foreign gateway 410 to use the VPN software 416 to instantiate a VPN client on the foreign gateway 410 and to establish a VPN connection 426 over the Internet connections 422 and 424. The Wi-Fi device 414 communicates with home gateway 402 via the VPN. The Wi-Fi device communicates with the Internet via the VPN and the Internet connection 422 of the home gateway 402. At any given time, the IP address of the Wi-Fi device, which was issued by the home gateway, 402 remains the same and the end point of the session (that is, the user's home gateway) is also the same. Thus, established sessions are maintained. In this way, VoIP calls, IPTV program delivery and other services that rely on session-based protocols can be handed off without loss of communications. The VPN may be established using known protocols such as L2TP, L2F and PPTP.

The VPN 426 provides the roaming subscriber with the same network functionality that the subscriber would have if connected directly to the home gateway (either through a wired or wireless link). For example, if the home gateway is configured to permit the subscriber to access content on a DVR, the same access would be available to the subscriber through a VAP of the service provider.

The VPN 426 also isolates the gateway in which the serving Wi-Fi VAP resides from the activities of the subscriber. Thus, if the subscriber is guilty of misconduct (spam, denial of service attacks), the subscriber's activities are not associated with the IP address of the owner of the serving gateway.

In an embodiment, the roaming service may be provided as a valued added service. In this embodiment, the class of service (CoS) determines what a subscriber pays for service and what a subscriber receives in return. Referring again to FIG. 2, the Wi-Fi roaming datastore 230 may be implemented using authentication, authorization, and accounting (AAA) management software. For example, the Wi-Fi roaming datastore 230 may be implemented on a server operating the RADIUS networking protocol. RADIUS is a client/server protocol that runs in the application layer, using UDP as transport. A home gateway operates a RADIUS client component that communicates with the RADIUS server.

In this embodiment, the AAA management software performs the subscriber authentication processes described above to authenticate users or devices before granting them access to the VAP devices of the network service provider. The AAA management software may also provide accounting of roaming services used by a subscriber account and provide billing information to a billing system (not illustrated).

By way of illustration, the unique MAC address of the Wi-Fi device may be used as the username of the account in the RADIUS server. The SSID would be the password for the account. If the Wi-Fi MAC address and SSID presented by the Wi-Fi device match what is stored in the RADIUS server, the security credentials and CoS are returned to the foreign home gateway and the VAP is set up and instantiated.

In yet another embodiment, a network service provider that does not have its own edge network (sometimes referred to herein as an "over-the-top network") may not cooperate with network service providers that have edge networks. For the over-the-top network service providers to make their roaming networks available to the subscribers of the other network service providers, the over-the-top network service providers will need to make sure that each of its foreign gateways can establish a network connection to the home gateway device without being blocked by the edge network service providers at either end.

Figure 4B:
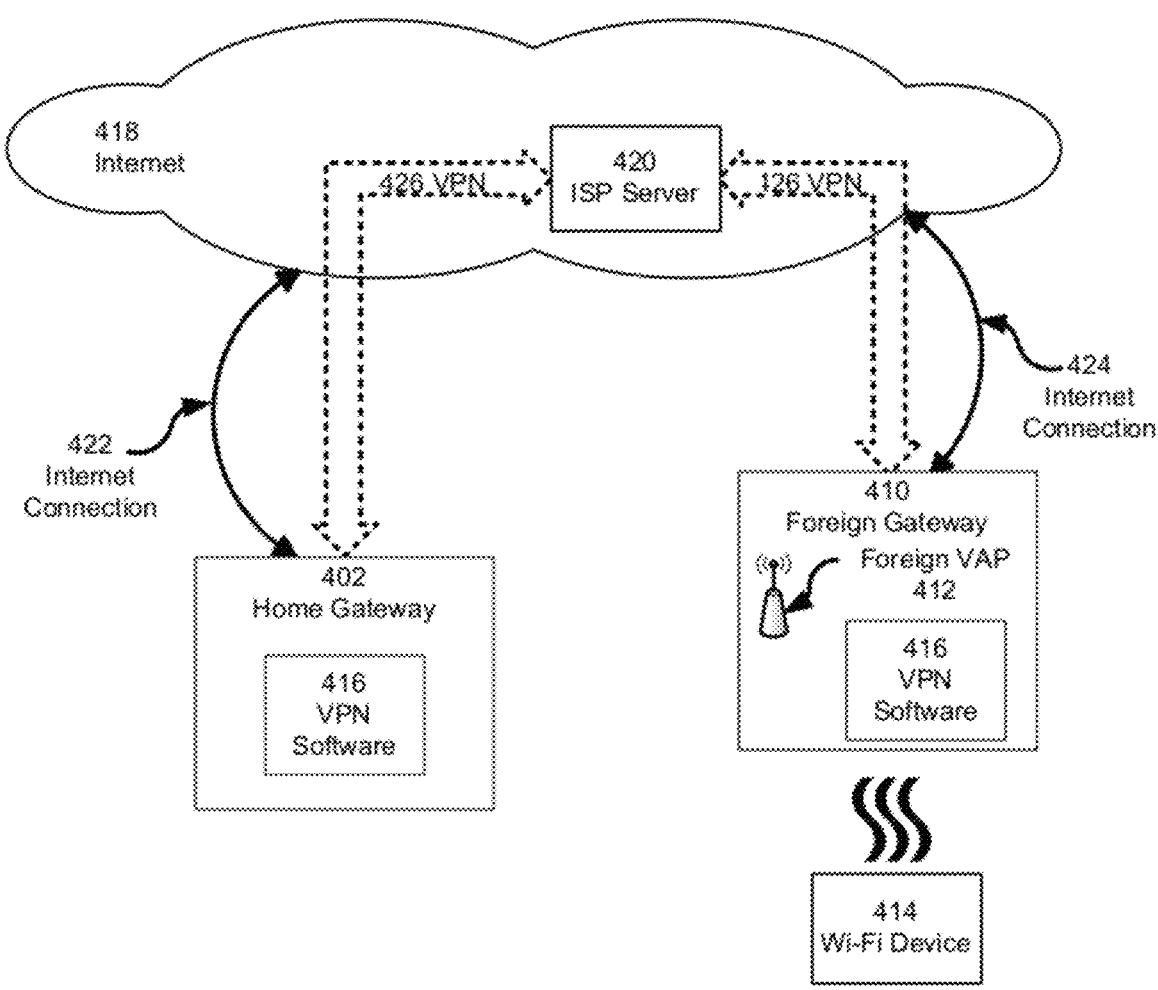

FIG. 4B is a block diagram illustrating a virtual private network connection between a home gateway of an over-the-top service provider and a roaming Wi-Fi device according to an embodiment. In this embodiment, a roaming Wi-Fi device 414 is associated with (connected to) a foreign VAP 412 in a foreign gateway 410. The foreign gateway 410 connects to the Internet 418 via an Internet connection 424. A home gateway 402 is associated with a subscriber who is also associated with the roaming Wi-Fi device 414. The home gateway 402 connects to the Internet via an Internet connection 422. In an embodiment, the Internet connections 422 and 424 may be established over a wired or wireless network. By way of illustration and not by way of limitation, the Internet connections 422 and 424 may be established over a cable network, a fiber network, a DSL connection, a satellite network, and a cellular network.

An over-the-top service provider home gateway device first establishes a VPN connection 426 to an over-the-top service provider ISP Server 420. A VAP receiving a probe request first checks with the Wi-Fi roaming datastore 230 of the over-the-top service provider. If authentication credentials sent in the probe request are found in the Wi-Fi roaming datastore 230 of the over-the-top service provider, the information is also sent to the ISP Server 420, so that its VPN connections 426 may be mapped by the ISP Server 420. In this way, a seamless connection from the Wi-Fi Device 414 can be made to the home gateway 402 through the foreign gateway 410 via the ISP Server 420.

In yet another embodiment, an "over-the-top" network service provider may want to provide services to subscribers with roaming Wi-Fi Devices that have no corresponding home gateways. In this embodiment, the over-the-top network service provider will collect the subscriber Wi-Fi roaming record 232 by other means than that of the home gateway device and store it in the Wi-Fi roaming datastore 230. A VAP receiving a probe request first checks with the Wi-Fi roaming datastore 230 of the over-the-top service provider. If authentication credentials sent in the probe request are found in the Wi-Fi roaming datastore 230 of the over-the-top service provider, the information is also sent to the ISP Server 420, so that the VPN connection 426 may be mapped by the ISP Server 420. In this way, a seamless connection from the Wi-Fi Device 414 can be made to 420 through the foreign gateway 410 and then out to the Internet 418.

Alternatively, the cooperating network service providers may establish a "central" repository for roaming authentication information. The central repository may be a distributed storage system that is accessible through a single interface. The interface may route authentication requests based on one or more attributes of the VAP that are reflected in the probe request.

In another embodiment, the operator of the roaming Wi-Fi network is not the HSD service provider that serves the roaming subscriber. Rather, the operator acquires Wi-Fi capacity from such service providers and provides roaming services for a fee. In this embodiment, the Wi-Fi roaming datastore 230 is accessible to or operated by the operator of the roaming Wi-Fi network.

As previously discussed, the Wi-Fi device may be a Wi-Fi phone that is also configured to access a cellular network (sometimes referred to as a "hybrid Wi-Fi device"). In an embodiment, a hybrid Wi-Fi device may be further configured to establish and tear down VPN tunnels between itself and a home gateway without the need for additional logic or hardware in the network over which a tunnel would be established. Thus, in this embodiment, the VPN tunnel logic has been moved to the edge of the network.

Figure 5:
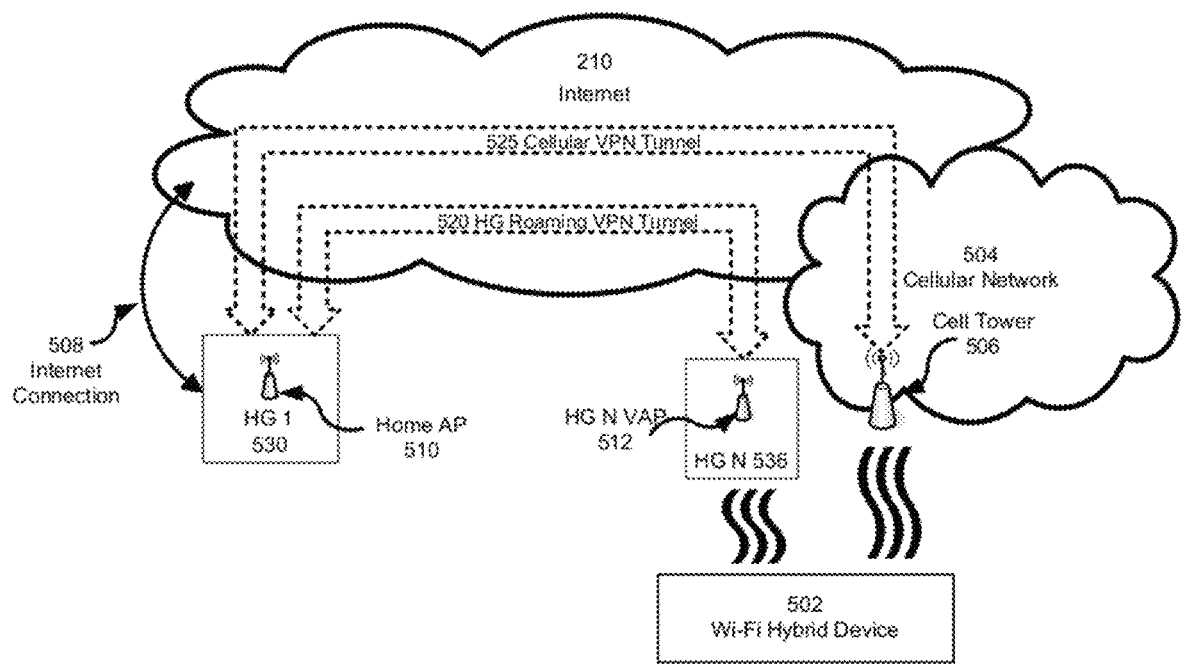
FIG. 5 is a block diagram illustrating a communication continuously provided to a hybrid Wi-Fi device over a Wi-Fi roaming network and a cellular data network according to an embodiment.

FIG. 5 is a block diagram illustrating a communication continuously provided to a hybrid Wi-Fi device over a Wi-Fi roaming network and a cellular data network according to an embodiment.

In an embodiment, a Wi-Fi hybrid device 502 comprises a Wi-Fi radio (not illustrated) and a cellular radio (not illustrated) to allow the Wi-Fi hybrid device 502 to communicate with a Wi-Fi VAP, such as Wi-Fi VAP 512 within HG N 536 and with a cell tower such as cell tower 506 of the cellular network 504. By way of illustration and not by way of limitation, the cellular data network 504 may be a General Packet Radio Service network, an EDGE Enhanced Data network, an Evolution Data Optimized network, a Universal Mobile Telecommunications System network, a High Speed Packet Access network, a Long Term Evolution and a Wide Interoperability for Microwave Access network or a network meeting another standard.

The Wi-Fi hybrid device 502 is configured to be "aware" of the home gateway HG 1 530. The HG 1 530 is part of a network of home gateways that operate together to form an HSD service area (see, FIG. 2, 214). For the purposes of FIG. 5, the HG N 536 is considered to be on the outer boundary of this HSD service area.

The Wi-Fi hybrid device 502 uses a "virtual IP address" (VIP) to send IP packets to, and receive IP packets from, HG 1 530 while roaming. From the point of view of the HG 1 220, there are two IP address associated with the virtual private network (VPN) operating over HG roaming VPN tunnel 520. The first IP address is associated with the Wi-Fi hybrid device 502 end-point. A second IP address is assigned by the HG 1 220 but controlled by the Wi-Fi hybrid device 502 and is used for data communication (service IP/VIP). The two IP addresses are in the same subnet.

The HG roaming VPN tunnel 520 may be implemented using any layer 2 encapsulation protocols, such as L2TP, PPTP and L2F among others. The VPN may be encrypted, using techniques such as L2TP over IPSEC, if the Class of Service (CoS) has that attribute as defined by the customers when they signed up for the service.

At a point in time, the Wi-Fi hybrid device 502 is connected to HG 1 220 through the HG N 226 and the HG roaming VPN tunnel 520 and has an idle-state data connection to a cellular network 504. Thus, at this point in time, the Wi-Fi hybrid device 502 is sending packets to the HG 1 530 connected to the cellular data network 504 but is not sending packets over the cellular data network 504.

The Wi-Fi hybrid device 502 may detect that it is moving away from accessible home gateways within the HSD service area.

In an embodiment, the Wi-Fi hybrid device 502 detects this condition by determining that there is only a single roaming HG within its range. In another embodiment, the Wi-Fi hybrid device 502 detects this condition by determining that the signal strengths from all of the roaming HGs within its range are declining. In still another embodiment, the Wi-Fi hybrid device 502 detects this condition by utilizing a digital map showing all known HGs in the HSD service area and determining that it is physically moving to an area without roaming HG coverage. In an embodiment, the location of the hybrid device 502 relative to the digital map may be determined using a GPS module 600 (see FIG. 6).

When the Wi-Fi hybrid device 502 determines that it is leaving its HSD service area, the Wi-Fi hybrid device 502 forms a cellular VPN tunnel 525 to the HG 1 530 using its cellular radio (not illustrated) over the cellular data network 504. The cellular VPN tunnel 525 may be implemented using any layer 2 encapsulation protocols, such as L2TP, PPTP, and L2F among others. The cellular VPN tunnel 525 may be encrypted, using techniques such as L2TP over IPSEC, if the Class of Service (CoS) has that attribute as defined by the customers when they signed up for the service. The Wi-Fi hybrid device is now considered multihomed.

The cellular VPN tunnel 525 is in the same virtual local area network (VLAN) and in the same subnet as the IP address associated with the Wi-Fi hybrid device 502 endpoint IP and the VIP address assigned by the HG 1 530 to the Wi-Fi hybrid device 502 as described above. From the perspective of HG 1 530, following the formation of the cellular VPN tunnel 525, the Wi-Fi hybrid device 502 has a second physical connection to it with another IP address associated with the Wi-Fi hybrid device 502 end point.

It should be noted that the cellular radio component (not illustrated) of the Wi-Fi hybrid device 502 may have an IP address assigned to it by the provider of cellular network 504. However, other than passing the VPN IP traffic through, this IP address is not used to communicate packets to the HG 1 530.

Wi-Fi hybrid device 502 monitors the condition of the Wi-Fi link signal to HG N 536 to determine whether a threshold has been reached. In an embodiment, this threshold may be defined by the Class of Service (CoS) assigned to a subscriber at the time the service agreement between the subscriber and the service provider was executed. Once the threshold is reached, the Wi-Fi hybrid device 502 reassigns the service IP/VIP from its Wi-Fi radio to its cellular radio. The Wi-Fi hybrid device 502 may send an ARP to HG 1 530. From the perspective of HG 1 530, it appears that the service IP/VIP moved from the Wi-Fi radio interface to the cellular radio interface in real-time. IP packets directed to and from the Wi-Fi hybrid device 502 will then immediately start using the cellular VPN tunnel 525 for communication thereby maintaining any previously established sessions. When the HG roaming VPN tunnel 520 connection becomes unacceptable, it will be torn down and only the cellular VPN tunnel 525 will remain.

At this point in the time the Wi-Fi hybrid device 502 is connected to HG 1 530 through the cellular VPN tunnel 525. From the point of view of the HG 1 220, at this point in time there are two IP addresses associated with the virtual private network (VPN) operating over the cellular VPN tunnel 525. The first IP address is associated with the Wi-Fi hybrid device 502 end-point. A second IP address is assigned by the HG 1 530 but controlled by the Wi-Fi hybrid device 502 and is used for data communication (service IP/VIP). The two IP addresses are in the same subnet.

In an embodiment, the Wi-Fi hybrid device 502 may monitor the availability of a VAP that belongs to its HSD service area. In an embodiment, the Wi-Fi hybrid device 502 detects this condition by determining that a single roaming HG has come within its range. In another embodiment, the Wi-Fi hybrid device 502 detects this condition by determining that the signal strengths from all of the roaming HGs within its range are increasing. In still another embodiment, the Wi-Fi hybrid device 502 detects this condition by utilizing a digital map showing all known HGs in the HSD service area and determining that it is physically moving to an area that has roaming coverage. In an embodiment, the location of the hybrid device 502 relative to the digital map may be determined using a GPS module 600 (see FIG. 6).

When the Wi-Fi hybrid device 502 determines that it is entering its HSD service area, the Wi-Fi hybrid device 502 associates with a VAP that is part of the HSD service area, such as HG N VAP 512 in the HG N 536. The HG N 536 forms an HG roaming VPN tunnel 520 connection to its associated HG over its service provider network. The HG roaming VPN tunnel 520 may be implemented using any layer 2 encapsulation protocols, such as L2TP, PPTP, and L2F among others. The VPN may be encrypted, using a technique such as L2TP over IPSEC, if the Class of Service (CoS) has that attribute as defined by the customers when they signed up for the service.

The HG roaming VPN tunnel 520 is in the same virtual local area network (VLAN) and in the same subnet as the IP address associated with the Wi-Fi hybrid device 502 endpoint IP and the VIP address assigned by the HG 1 530 to the Wi-Fi hybrid device 502 as described above. From the perspective of HG 1 220, following the formation of the HG roaming VPN tunnel 520, the Wi-Fi hybrid device 502 has a second physical connection to it with another IP address associated with the Wi-Fi hybrid device 502 end point. The Wi-Fi hybrid device is now considered multihomed.

Wi-Fi hybrid device 502 monitors the condition of the Wi-Fi link signal to HG N 536 to determine whether a threshold has been reached. In an embodiment, this threshold may be defined by the Class of Service (CoS) assigned to a subscriber at the time the service agreement between the subscriber and the service provider was executed. Once the threshold is reached, the Wi-Fi hybrid device 502 reassigns the service IP/VIP from its cellular radio to its Wi-Fi radio. The Wi-Fi hybrid device 502 may send an ARP to HG 1 220. From the perspective of HG 1 530, it appears that the service IP/VIP moved from the cellular radio interface to the Wi-Fi radio interface in real-time. IP packets directed to and from the Wi-Fi hybrid device 502 will then immediately start using the HG roaming VPN tunnel 520 for communication thereby maintaining any previously established sessions. When the HG roaming VPN tunnel 520 connection is determined to be reliable, the cellular VPN tunnel 525 will be torn down.

During the handoff phases, packets may be lost. However, if protocols such as TCP/IP are used, lost packets will be re-transmitted and thus session quality may be maintained.

In yet another embodiment, when the hybrid device 502 becomes multihomed, instead of relinquishing its second network path (520 or 525) to the HG 1 530, it forms a channel or Ethernet bonding where the independent VPN tunnels 520 and 525 combine to form a redundant array of independent network interfaces (RAIN). Using this method, data packets may be striped across the network interfaces in the same manner that I/O is striped across disks in a RAID array. In some cases, the combination can be for redundancy (mirrored—same data packets go down both paths), or for increased throughput (striped—alternate data packets go down each path) as desired by the subscriber at that moment.

In an embodiment, the combinations allowed, either mirrored and/or striped, or none, may be defined by the Class of Service (CoS) assigned to a subscriber at the time the service agreement between the subscriber and the service provider was executed.

In another embodiment, the defined Class of Service (CoS) as assigned to a subscriber at the time the service agreement between the subscriber and the service provider was executed may be changed by the subscriber during a limited period of time (temporary basis), or for the remaining duration of the service agreement (permanent basis) as the need arises, or as a promotion by the service provider for the purposes of up selling the subscriber.

Figure 6:
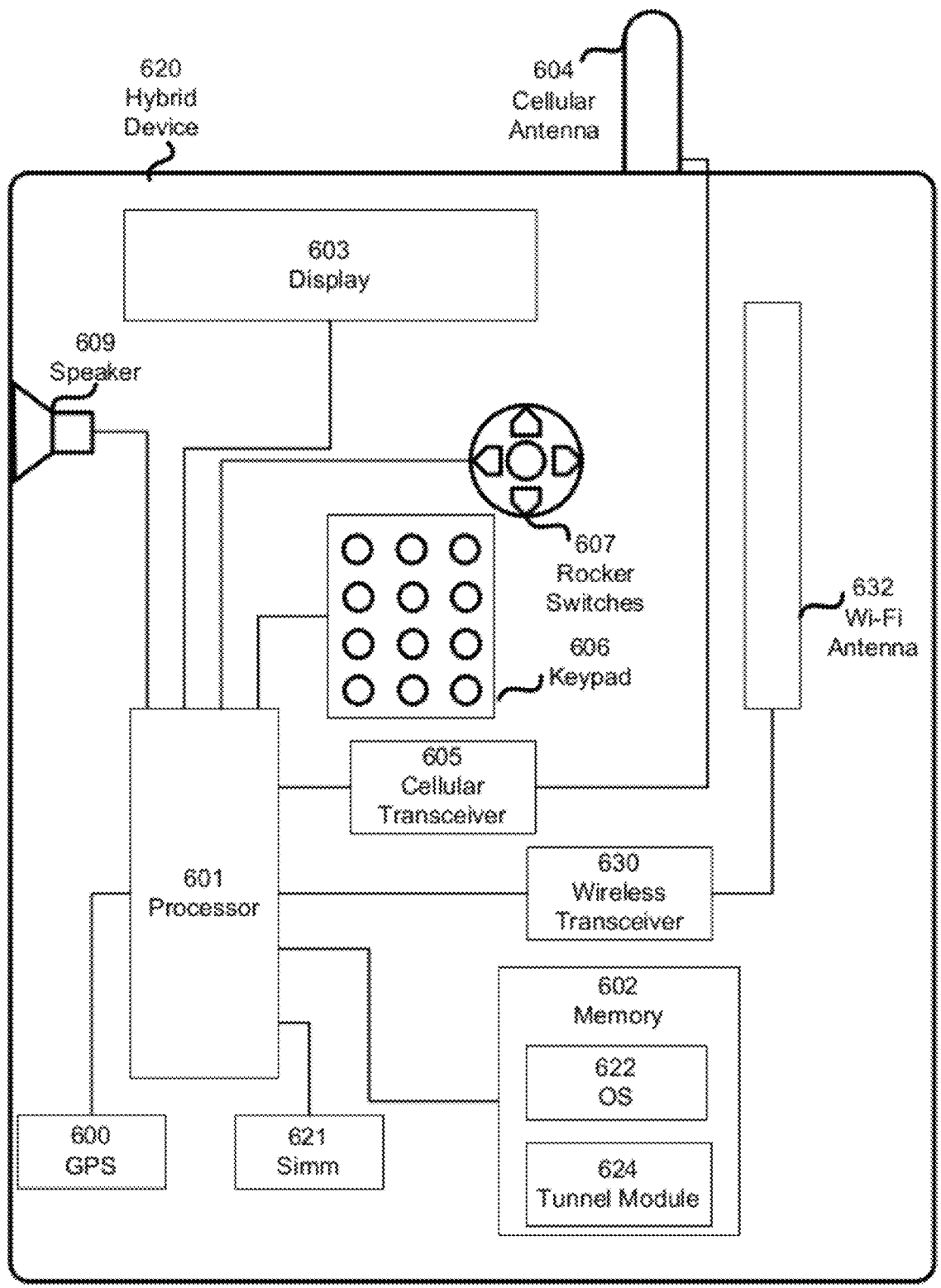
FIG. 6 is a block diagram illustrating a hybrid device according to an embodiment.

FIG. 6 is a block diagram illustrating a hybrid device according to an embodiment.

A hybrid device 620 may include a processor 601 coupled to an internal memory 602, to a display 603 and to a SIM 621 or similar removable memory unit. Additionally, the computing device 620 may have a cellular antenna 604 for sending and receiving electromagnetic radiation that is connected to a cellular transceiver 605 coupled to the processor 601. In some implementations, the transceiver 605 and portions of the processor 601 and memory 602 may be used for multi-network communications. The hybrid device 620 may also include a key pad 606 or miniature keyboard and menu selection buttons or rocker switches 607 for receiving user inputs. The hybrid device 620 may also include a GPS navigation device 600 coupled to the processor and used for determining the location coordinates of the computing device 620. Additionally, the display 603 may be a touch-sensitive device that may be configured to receive user inputs.

A wireless transceiver 630 provides wireless communications via wireless antenna 632. By way of illustration and not by way of limitation, the wireless transceiver may be compliant with 802.11x standards.

The processor 601 may be any programmable microprocessor, microcomputer or multiple processor chip or chips that can be configured by software instructions (applications) to perform a variety of functions, including the functions of the various embodiments described herein. In an embodiment, the hybrid device 620 may include multiple processors 601, such as one processor dedicated to cellular and/or wireless communication functions and one processor dedicated to running other applications.

Typically, software applications may be stored in the internal memory 602 before they are accessed and loaded into the processor 601. In an embodiment, the processor 601 may include or have access to an internal memory 602 sufficient to store the application software instructions. The memory may also include an operating system 622. In an embodiment, the memory also includes a tunneling module 624 that provides additional functionality to the hybrid device 620 to permit the hybrid device 620 to create and tear down tunnels to a home gateway as previously described.

The internal memory of the processor may include a secure memory (not illustrated) which is not directly accessible by users or applications and that is capable of recording MDINs and SIM IDs as described in the various embodiments. As part of the processor, such a secure memory may not be replaced or accessed without damaging or replacing the processor.

In an embodiment, additional memory chips (e.g., a Secure Data (SD) card) may be plugged into the hybrid device 620 and coupled to the processor 601. In an embodiment, the tunneling module 624 may be provided on an SD card or other external memory device to add the tunneling functionality to an existing mobile device, thereby converting the mobile device to a hybrid device.

Additionally, the internal memory 602 may be a volatile or nonvolatile memory, such as flash memory, or a mixture of both. For the purposes of this description, a general reference to memory refers to all memory accessible by the processor 601, including internal memory 602, removable memory plugged into the computing device, and memory within the processor 601 itself, including the secure memory.

The foregoing method descriptions and the process flow diagrams are provided merely as illustrative examples and are not intended to require or imply that the steps of the various embodiments must be performed in the order presented. As will be appreciated by one of skill in the art, the order of steps in the foregoing embodiments may be performed in any order. Further, words such as "thereafter," "then," "next," etc. are not intended to limit the order of the steps; these words are simply used to guide the reader through the description of the methods.

Figure 7:
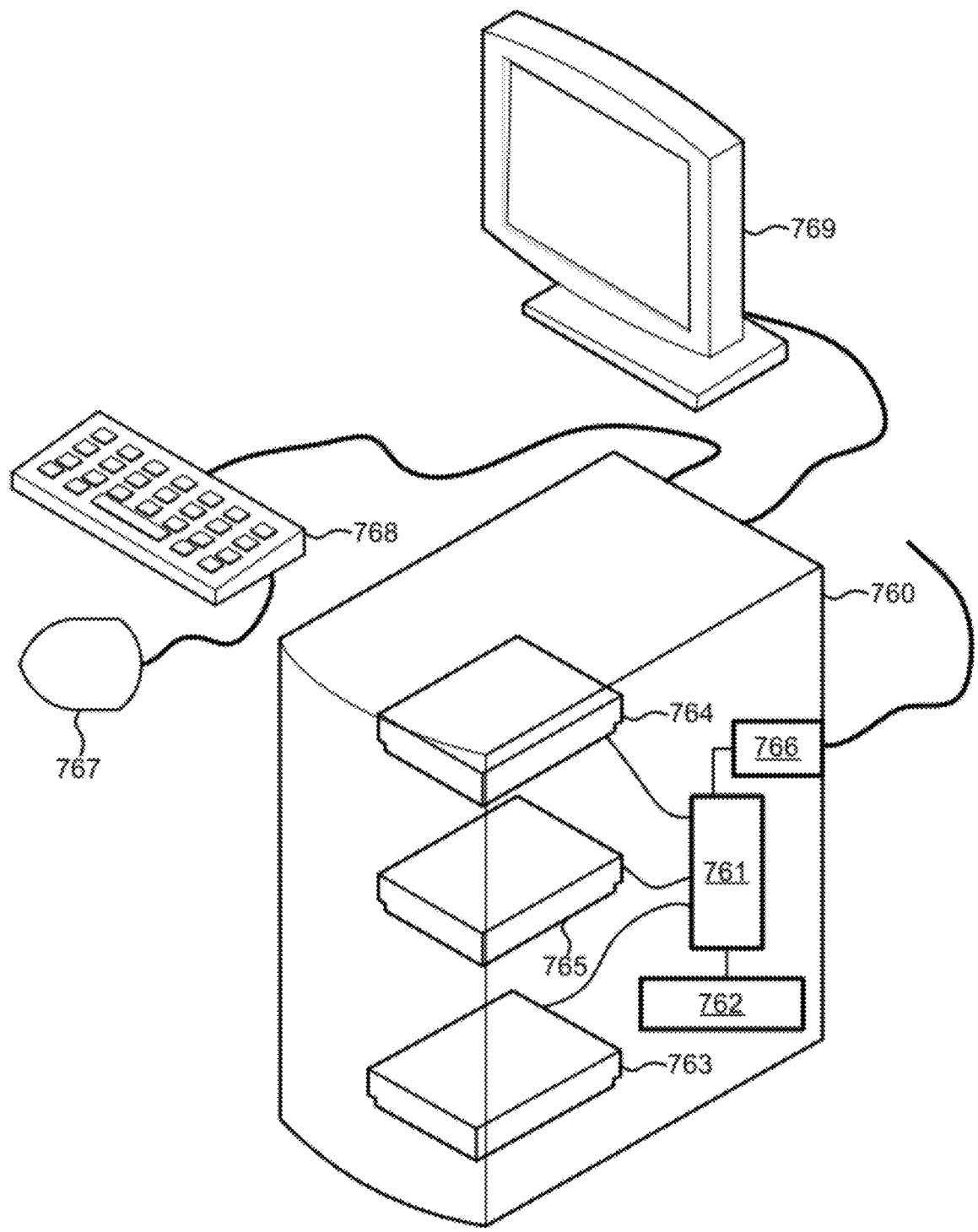
FIG. 7 is a block diagram of a computing device.

As previously described, the subscriber may interact with the various servers and network components using a variety of the computing devices, including a personal computer. By way of illustration, the functional components of a computing device 760 are illustrated in FIG. 7. Such a computing device 760 typically includes a processor 761 coupled to volatile memory 762 and a large capacity nonvolatile memory, such as a disk drive 763. The computing device 760 may also include a floppy disc drive 764 and a compact disc (CD) drive 765 coupled to the processor 761. Typically the computing device 760 will also include a pointing device such as a mouse 767, a user input device such as a keyboard 768 and a display 769. The computing device 760 may also include a number of connector ports 766 coupled to the processor 761 for establishing data connections or network connections or for receiving external memory devices, such as a USB or FireWire® connector sockets. In a notebook configuration, the computer housing includes the pointing device 767, keyboard 768 and the display 769 as is well known in the computer arts.

While the computing device 760 is illustrated as using a desktop form factor, the illustrated form is not meant to be limiting. For example, some or all of the components of computing device 760 may be implemented as a desktop computer, a laptop computer, a mini-computer, or a personal data assistant.

A number of the embodiments described above may also be implemented with any of a variety of computing devices, such as the server device 1100 illustrated in FIG. 8. Such a server device 800 typically includes a processor 801 coupled to volatile memory 802 and a large capacity nonvolatile memory, such as a disk drive 803. The server device 800 may also include a floppy disc drive and/or a compact disc (CD) drive 806 coupled to the processor 801. The server device 800 may also include network access ports 804 coupled to the processor 801 for establishing data connections with network circuits 805 over a variety of wired and wireless networks using a variety of protocols.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an," or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Functionality of various logical blocks may be performed by other logical blocks or circuits. Additionally, functionality of various logical blocks may be performed by additional logical blocks or circuits that are not separately illustrated.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The blocks of a method or algorithm disclosed herein may be embodied in a processor-executable software module, which may reside on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A system for providing Wi-Fi roaming within a service provider network, the system comprising:
    a roaming Wi-Fi device, comprising a media access control (MAC) address;
    a roaming datastore storing service set identifications (SSIDs) and security configurations of one or more wireless access points (APs) in association with MAC addresses of one or more roaming Wi-Fi devices, wherein the one or more APs are nodes in the service provider network;
    a first wireless AP device configured with an SSID and a security configuration, wherein the first wireless AP is a component of a home gateway; and
    a second wireless AP device, wherein the second wireless AP device is a component of a foreign gateway and wherein the second wireless AP comprises a processor configured with processor executable software instructions to perform operations comprising:
    instantiating a virtual access point (VAP);
    receiving a probe request frame from a roaming Wi-Fi device, wherein the probe request comprises the MAC address of the roaming Wi-Fi device and the SSID of the first wireless AP device;
    determining that the roaming Wi-Fi device access is authorized to associate with the VAP when the SSID of the first wireless AP is stored in the roaming datastore in association with the MAC address of the roaming Wi-Fi device;
    retrieving the security configuration of the first wireless AP from the roaming datastore when the roaming Wi-Fi device is authorized;
    associating with the roaming Wi-Fi device using the SSID and the security configuration of the first wireless AP device when it is determined that the roaming Wi-Fi device is authorized;
    establishing a tunnel between the foreign gateway and the home gateway over a network; and
    providing the roaming Wi-Fi device access to the home gateway via the tunnel while maintaining an internet protocol (IP) address of the roaming Wi-Fi device assigned to the roaming Wi-Fi device by the home gateway.

2. The system of claim 1, wherein the roaming Wi-Fi device is selected from the group consisting of a laptop computer, a notebook computer, a personal digital assistant (PDA), a voice over Internet Protocol (VoIP) phone, and a dual network Wi-Fi phone.

3. The system of claim 1, wherein the VAP communicates with the roaming Wi-Fi device via a communication protocol selected from the group consisting of IEEE 802.11 (a), 802.11b, 802.11g, and 802.11n.

4. The system of claim 1, wherein the home gateway comprises a processor configured with processor executable instructions to perform operations further comprising:
    providing the roaming Wi-Fi device access to the service provider network when it is determined that the roaming Wi-Fi device is authorized.

5. The system of claim 4, wherein the home gateway processor is configured with processor executable instructions to perform operations further comprising:
    providing the roaming Wi-Fi device access to the Internet via the service provider network.

6. The system of claim 1, wherein the network is the Internet.

7. The system of claim 1, wherein the roaming Wi-Fi device is associated with a third wireless AP device and wherein the second wireless AP device processor is configured with processor executable instructions to perform operations further comprising:
    re-associating the roaming Wi-Fi device with the VAP.

8. The system of claim 1, wherein the roaming datastore is implemented on a server device operating a RADIUS networking protocol.

9. A first system for providing Wi-Fi roaming as in claim 1 and a second system for providing Wi-Fi roaming as in claim 1, wherein the first system is operated by a first service provider and the second system is operated by a second service provider, wherein a central roaming datastore comprises the roaming datastore of the first system and the roaming datastore of the second system, and wherein the first system and the second system are cooperatively accessible to Wi-Fi devices of customers of the first and second service providers having entries in the first or second roaming datastore.

10. The system of claim 1, wherein the second wireless AP device processor is configured with processor executable software instructions to perform operations such that communicating with the roaming Wi-Fi device using the SSID of the first wireless AP device comprises maintaining an established session of the roaming Wi-Fi device.

11. The system of claim 1 wherein communicating with the roaming Wi-Fi device using the SSID of the first wireless AP device comprises maintaining an established session of the roaming Wi-Fi device.

12. A method for providing Wi-Fi roaming within a service provider network, the method comprising:
    instantiating in a processor of a first wireless access point (AP) device a virtual access point (VAP), wherein the first wireless AP is a component of a foreign gateway;
    receiving by the first wireless AP a probe request frame from a roaming Wi-Fi device, wherein the probe request comprises a media access control (MAC) address of the roaming Wi-Fi device and a service set identification (SSID) of a second wireless AP device, wherein the second wireless AP is a component of a home gateway;

determining that the roaming Wi-Fi device is authorized to associate with the VAP when it is determined that the received SSID of the second wireless AP device is stored in a roaming datastore in association with the MAC address of the roaming Wi-Fi device;

retrieving a security configuration of the second wireless AP from the roaming datastore when the roaming Wi-Fi device is authorized;

associating the roaming Wi-Fi device with the first wireless AP using the SSID and the security configuration of the second wireless AP device when it is determined that the roaming Wi-Fi device is authorized;

establishing a tunnel between the foreign gateway and the home gateway over a network; and providing the roaming Wi-Fi device access to the home gateway via the tunnel while maintaining an internet protocol (IP) address of the roaming Wi-Fi device assigned to the roaming Wi-Fi device by the home gateway.

13. The method of claim 12, wherein receiving a probe request frame from a roaming Wi-Fi device comprises receiving a probe request from one of a laptop computer, a notebook computer, a personal digital assistant (PDA), a voice over Internet Protocol (VoIP) phone, and a dual network Wi-Fi phone.

14. The method of claim 12, further comprising the VAP communicating with the roaming Wi-Fi device via a communication protocol selected from the group consisting of IEEE 802.11 (a), 802.11b, 802.11g, and 802.11 n.

15. The method of claim 12, further comprising providing the roaming Wi-Fi device access to the service provider network when it is determined that the roaming Wi-Fi device is authorized.

16. The method of claim 15 further comprising providing the roaming Wi-Fi device access to the Internet via the service provider network.

17. The method of claim 12, wherein establishing a tunnel between the foreign gateway and the home gateway over the network comprises:

establishing a tunnel between the foreign gateway and the home gateway over the Internet.

18. The method of claim 15, wherein the roaming Wi-Fi device is associated with a third wireless AP device and wherein the method further comprises:

re-associating the roaming Wi-Fi device with the VAP.

19. The method of claim 18, wherein accessing a roaming datastore comprises accessing a datastore implemented on a server device operating a RADIUS networking protocol.

* * * * *

UNITED STATES PATENT AND TRADEMARK OFFICE
CERTIFICATE OF CORRECTION

| | |
|---|---|
| PATENT NO. | : 8,553,662 B2 |
| APPLICATION NO. | : 12/859964 |
| DATED | : October 8, 2013 |
| INVENTOR(S) | : Chen et al. |

Page 1 of 1

It is certified that error appears in the above-identified patent and that said Letters Patent is hereby corrected as shown below:

On the Title page, item [73], delete "Time Warner Cable, Inc." and insert --Time Warner Cable Enterprises LLC--

Signed and Sealed this
Thirtieth Day of June, 2015

Michelle K. Lee
*Director of the United States Patent and Trademark Office*